United States Patent
Peng et al.

(10) Patent No.: US 10,050,028 B2
(45) Date of Patent: Aug. 14, 2018

(54) SEMICONDUCTOR DEVICE WITH REDUCED LEAKAGE CURRENT

(71) Applicant: Taiwan Semiconductor Manufacturing Company Limited, Hsinchu (TW)

(72) Inventors: Shih-Wei Peng, Hsinchu (TW); Chung-Hsing Wang, Hsinchu County (TW); Chih-Liang Chen, Hsinchu (TW); Charles Chew-Yuen Young, Cupertino, CA (US); Jiann-Tyng Tzeng, Hsinchu (TW); Yi-Hsun Chiu, Hsinchu County (TW); Yuan-Te Hou, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

(21) Appl. No.: 15/475,257

(22) Filed: Mar. 31, 2017

(65) Prior Publication Data
US 2018/0151550 A1    May 31, 2018

Related U.S. Application Data

(60) Provisional application No. 62/426,715, filed on Nov. 28, 2016.

(51) Int. Cl.
*H01L 27/118* (2006.01)
*H01L 27/02* (2006.01)
*G06F 17/50* (2006.01)

(52) U.S. Cl.
CPC ...... *H01L 27/0207* (2013.01); *G06F 17/5072* (2013.01); *G06F 17/5077* (2013.01)

(58) Field of Classification Search
CPC .................... G06F 17/5072; G06F 17/5077
USPC ............. 257/202, 204, 207, 208, 314, 401
See application file for complete search history.

(56) References Cited

U.S. PATENT DOCUMENTS

| | | | |
|---|---|---|---|
| 2006/0001047 A1* | 1/2006 | Chun ........... | H01L 27/0203 257/202 |
| 2016/0110489 A1* | 4/2016 | Schroeder ...... | G06F 17/5072 716/119 |
| 2017/0371994 A1* | 12/2017 | Bowers ......... | G06F 17/5072 |

* cited by examiner

*Primary Examiner* — Tan N Tran
(74) *Attorney, Agent, or Firm* — Jones Day (57) ABSTRACT

An integrated circuit includes a substrate and a first set of functional cell units formed over the substrate. Each of the functional cell units includes a pair of functional cells that have different threshold voltages and a filler cell between the functional cells thereof. A number of the functional cell units in the first set is equal to or greater than a number of a second set of functional cell units, each of which includes a pair of functional cells that have different threshold voltages and that abut against each other. As such, a leakage current of the integrated circuit is reduced.

20 Claims, 8 Drawing Sheets

SEMICONDUCTOR DEVICE WITH REDUCED LEAKAGE CURRENT

CROSS-REFERENCE TO RELATED APPLICATION

This application claims priority to U.S. Provisional Patent Application No. 62/426,715, filed Nov. 28, 2016, which is incorporated herein by reference in its entirety.

BACKGROUND

In the design of integrated circuits, standard cells are widely used. Standard cells have predetermined circuit functions and are stored in cell libraries. During the design of an integrated circuit, the standard cells are retrieved from the cell libraries and are placed at desired locations in a layout. Routing is then performed to connect the standard cells to each other.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
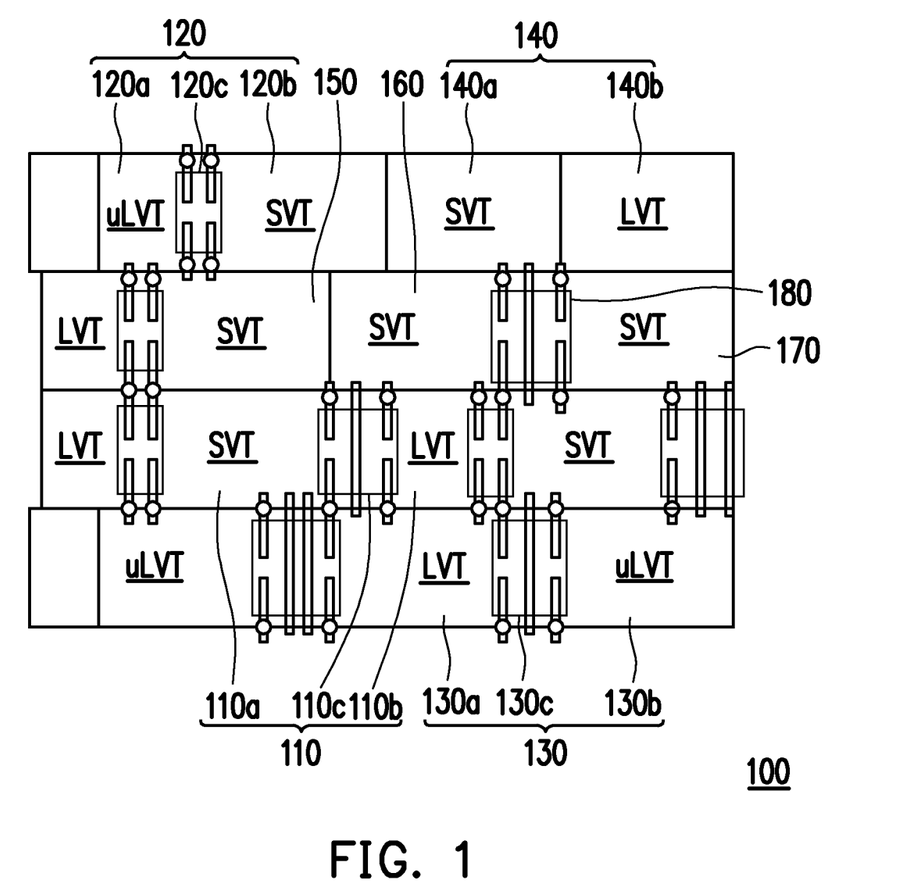
FIG. 1 is a schematic view illustrating an exemplary semiconductor device in accordance with some embodiments.

A semiconductor device, e.g., the semiconductor device 100 in FIG. 1, includes a plurality of functional cell units. The example of FIG. 1 includes functional cell unit 110, functional cell unit 120, functional cell unit 130, and functional cell unit 140. Each of the functional cell units 110, 120, 130, 140 includes a pair of functional cells that have different threshold voltages. A functional cell is configured to perform a predetermined circuit function. For example, a functional cell can implement an inverter configured to invert a signal from low to high, or vice versa.

As illustrated in FIG. 1, function cell unit 110 includes a standard voltage threshold (SVT) functional cell 110a and a low voltage threshold (LVT) functional cell 110b. The functional cell unit 120 includes an ultra-low voltage threshold (uLVT) functional cell 120a and an SVT functional cell 120b. An LVT functional cell has a threshold voltage lower than a threshold voltage of an SVT functional cell but higher than a threshold voltage of a uLVT functional cell.

A series of processes may be performed during manufacture of a semiconductor device in to order to produce functional cells having different threshold voltages, like the one illustrated in FIG. 1. For example, during manufacturing of such a semiconductor device, a first doping process is first performed on a first end portion of a continuous active region (e.g., region spanning SVT functional cells 140a, 140b of functional cell unit 140) in which the first functional cell (e.g., the SVT functional cell 140a of the functional cell unit 140) will be formed. Then, a second doping process is performed on a second end portion of the continuous active region in which a second functional cell (e.g., the LVT functional cell 140b of the functional cell unit 140) will be formed. The first and second doping processes are performed at different dopant concentrations resulting in the first and second functional cells having different threshold voltages. Because the first and second functional cells abut against each other, the first and second doping processes can result in undesired contamination of the first and second end portions of the continuous active region with the incorrect dopant concentration (e.g., near the junction of 140a, 140b). This can produce a semiconductor device that suffers from a high leakage current between the first and second functional cells.

Another series of processes may be performed during manufacture of a semiconductor device in to order to produce functional cells having different threshold voltages, like the one illustrated in FIG. 1. For example, during manufacturing of such a semiconductor device, a first metal gate is first deposited over a channel region of a transistor in a first end portion of a continuous active region (e.g., region spanning SVT functional cells 140a, 140b of functional cell unit 140) in which the first functional cell (e.g., the SVT functional cell 140a of the functional cell unit 140) will be formed. Then, a second metal gate is deposited over a channel region of a transistor in a second end portion of the continuous active region in which a second functional cell (e.g., the LVT functional cell 140b of the functional cell unit 140) will be formed. The first and second metal gates have different work functions (e.g., different materials, different thicknesses, different numbers of layers, or a combination thereof) resulting in the first and second functional cells having different threshold voltages. Because the first and second functional cells abut against each other, the deposition of the first metal gate can result in undesired contamination of the second metal gate (and vice versa) with the incorrect work function. This can produce a semiconductor device that suffers from a high leakage current between the first and second functional cells.

The present disclosure provides various exemplary embodiments of a semiconductor device (e.g., the semiconductor device 100) that has a low leakage current. The semiconductor device includes a plurality of functional cell units, e.g., one or more of the functional cell units 110, 120, 130. Each of the functional cell units 110, 120, 130 includes a pair of functional cells separated by a filler cell. For example, the functional cell unit 110 includes SVT and LVT functional cells 110a, 110b and a filler cell 110c between the SVT and LVT functional cells 110a, 110b. Such a filler cell can substantially minimize, if not eliminate, contamination of respective end portions of a continuous active region when performing a multi-dopant process on the end portions of the continuous active region.

FIG. 1 is a schematic view illustrating an exemplary semiconductor device 100 in accordance with some embodiments. As illustrated in FIG. 1, the semiconductor device 100, e.g., an application specific integrated circuit (ASIC), is divided into rows. Each row includes a plurality of functional cells that have different threshold voltages, e.g., uLVT, SVT, and LVT functional cells 120a, 120b, 140b in the first row. A functional cell is configured to perform a predetermined circuit function, including, Boolean logic functions, such as an inverter. In some embodiments, a functional cell includes a NOT gate, an AND gate, a NAND gate, an OR gate, a NOR gate, an XOR gate, an XNOR gate, another logic gate, or a combination thereof. Such a functional cell can therefore be termed as a standard cell. In other embodiments, a functional cell includes a logic gate and a passive/active device, e.g., a resistor, a capacitor, an inductor, a transistor, a diode, or the like.

The semiconductor device 100 further includes a pair of functional cells, e.g., SVT functional cells 150, 160, that have the same threshold voltage and that abut against each other. Because such functional cells have the same threshold voltage, a leakage current therebetween is small, or negligible. As such, a filler cell may not be included between those functional cells. A filler cell, e.g., filler cell 180, however, may be between a pair of functional cells, e.g., SVT functional cells 160, 170, that have the same threshold voltage in other instances, such as to fill a gap between such functional cells.

The semiconductor device 100 further includes a plurality of functional cell units 110, 120, 130, 140. It is noted herein that a functional cell unit includes a pair of functional cells that have different threshold voltages. For example, as illustrated in FIG. 1, the functional cell unit 110 includes SVT and LVT functional cells 110a, 110b. The functional cell unit 120 includes uLVT and SVT functional cells 120a, 120b. The functional cell unit 130 includes LVT and uLVT functional cells 130a, 130b. The functional cell unit 140 includes SVT and LVT functional cells 140a, 140b.

A functional cell unit may include separated functional cells. For example, as illustrated in FIG. 1, the functional cell unit 110 includes a filler cell 110c between the SVT and LVT functional cells 110a, 110b. The functional cell unit 120 further includes a filler cell 120c between the uLVT and the SVT functional cells 120a, 120b. The functional cell unit 130 further includes a filler cell 130c between the LVT and uLVT functional cells 130a, 130b.

A functional cell unit may include abutting functional cells. For example, as illustrated in FIG. 1, the SVT and LVT functional cells 140a, 140b of the functional cell unit 140 abut against each other. A high leakage current occurs between the functional cells 140a, 140b. As such, the semiconductor device 100 may or may not include such a functional cell unit.

In some embodiments, a number of functional cell units with separated functional cells is equal to or greater than a number of functional cell units with abutting functional cells. In other words, the ratio of the number of functional cell units with separated functional cells to the sum of the number of the functional cell units with separated functional cells and the number of the functional cell units with abutting functional cells ranges from 0.5 to 1. This reduces a leakage current of the semiconductor device 100 lower than a leakage current of a semiconductor device, a number of functional cell units with abutting functional cells of which is greater than a number of functional cell units with separated functional cells. In such some embodiments, a number of functional cell units with abutting functional cells of the semiconductor device 100 may or may not be zero.

In other embodiments, the ratio of the number of functional cell units with separated functional cells to the sum of the number of functional cell units with separated functional cells and the number of functional cell units with abutting functional cells ranges from about 0.6 to about 1.0, from about 0.7 to about 1.0, from about 0.8 to about 1.0, or from about 0.9 to about 1.0. This reduces a leakage current of the semiconductor device 100 lower than a leakage current of a semiconductor device, a number of functional cell units with separated functional cells of which is equal to a number of functional cell units with abutting functional cells. In such other embodiments, a number of functional cell units with abutting functional cells of the semiconductor device 100 may or may not be zero.

Figure 2:
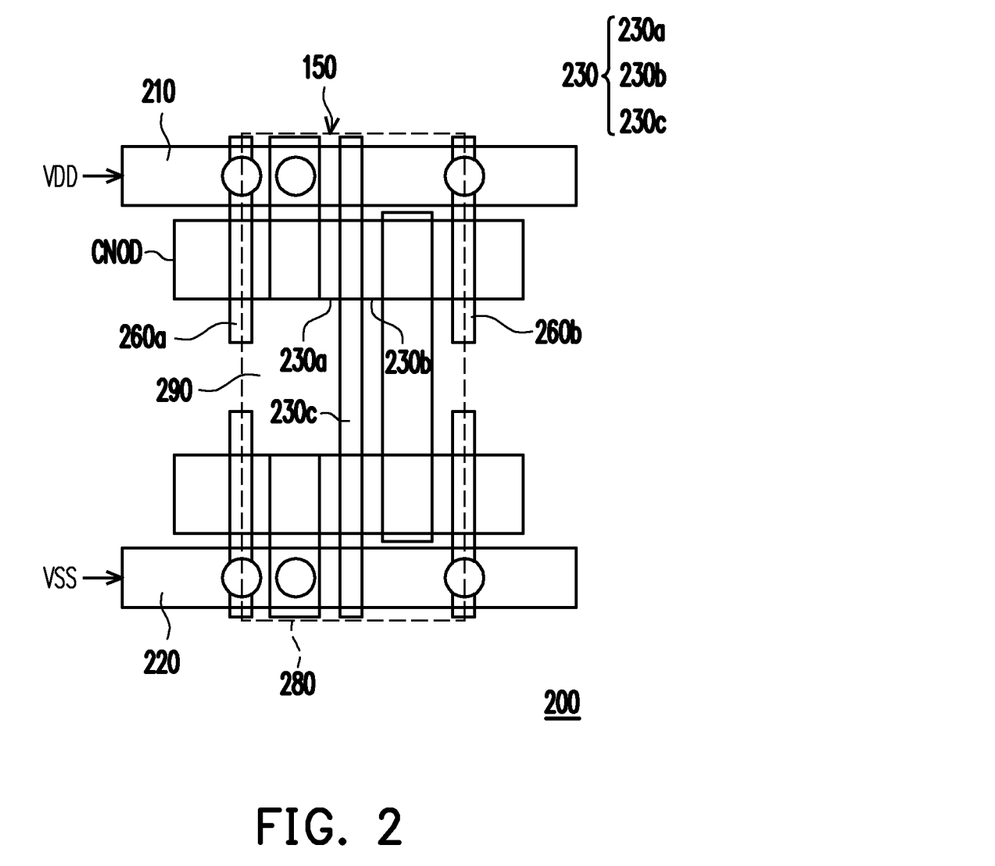
FIG. 2 is a schematic view illustrating an exemplary layout of a functional cell of a semiconductor device in accordance with some embodiments.

FIG. 2 is a schematic view illustrating an exemplary layout 200 of a functional cell of a semiconductor device, e.g., the SVT functional cell 150 of the semiconductor device 100, in accordance with some embodiments. The semiconductor device 100 includes a substrate 290 that has a continuous active region (CNOD), i.e., continuous oxide definition (OD) region.

The SVT functional cell 150 is enclosed by a boundary (indicated by dash lines 280) and includes power supply lines 210, 220. The power supply line 210 is configured to receive a first supply voltage, e.g., VDD. The power supply line 220 is configured to receive a second supply voltage, e.g., VSS, lower than the first supply voltage.

The SVT functional cell 150 further includes an SVT transistor 230 that in this embodiment is a field-effect transistor (FET), e.g., a p-type or n-type metal-oxide-semiconductor FET (MOSFET). As illustrated in FIG. 2, the SVT transistor 230 includes first and second source/drain regions 230a, 230b over the continuous active region (CNOD), a channel region (not visible) between the first and second source/drain regions 230a, 230b, and an active gate electrode 230c over the channel region thereof.

The SVT functional cell 150 further includes dummy gate electrodes 260a, 260b disposed at left and right sides of the boundary 280, respectively. In this embodiment, the dummy gate electrodes 260a, 260b are tied, i.e., connected, to the power supply line 210, through a horizontal metal line and/or a vertical metal line. In an alternative embodiment, one of the dummy gate electrodes 260a, 260b is connected to the power supply line 220.

Figure 3:
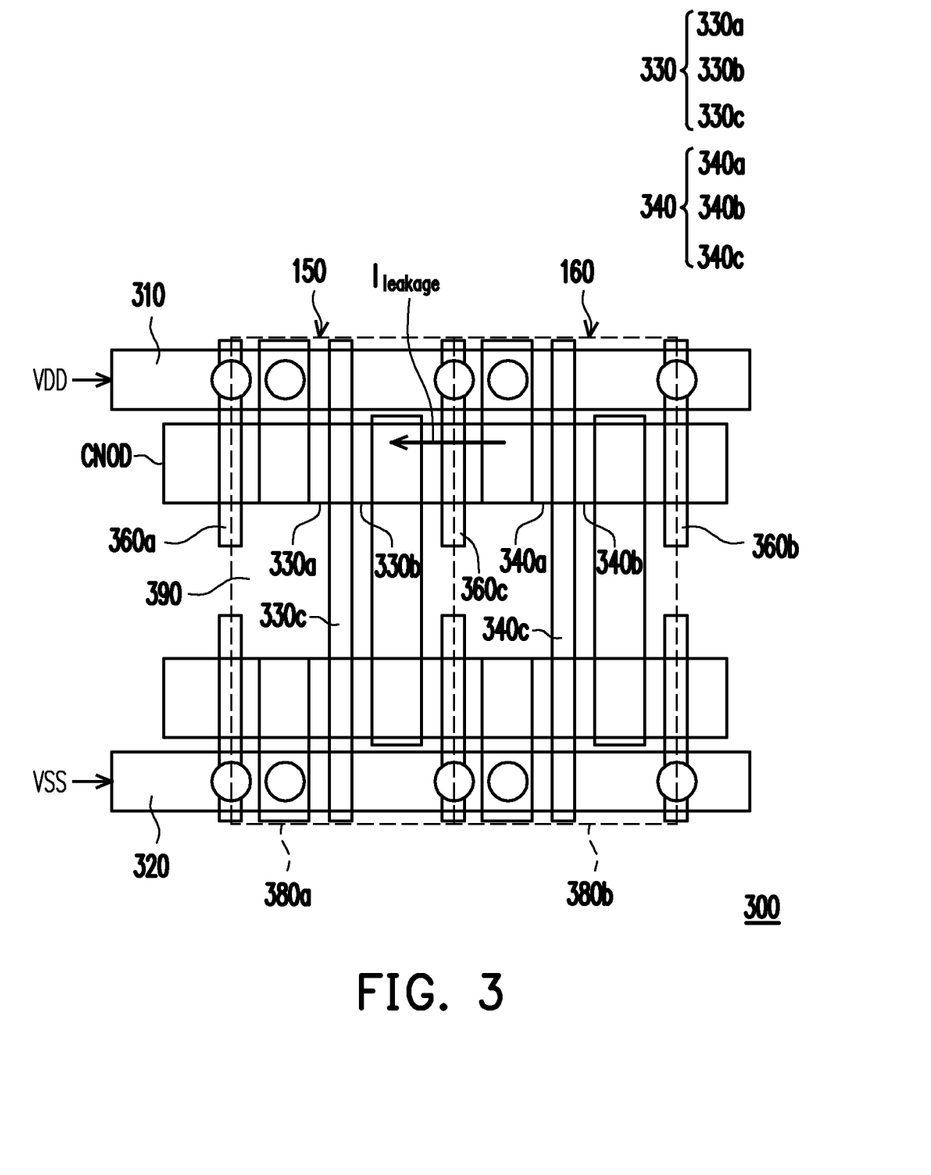
FIG. 3 is a schematic view illustrating an exemplary layout of a pair of functional cells of a semiconductor device in accordance with some embodiments.

FIG. 3 is a schematic view illustrating an exemplary layout 300 of a pair of functional cells of a semiconductor device, e.g., the SVT functional cells 150, 160 of the semiconductor device 100, in accordance with some embodiments. The semiconductor device 100 includes a substrate 390 that has a continuous active region (CNOD). The continuous active region (CNOD) includes opposite first and second end portions and an intermediate portion between the first and second end portions thereof.

The SVT functional cells 150, 160 have the same threshold voltage and abut against each other. The SVT functional cell 150 is enclosed by a boundary (indicated by dash lines 380a), is disposed in the first end portion of the continuous active region (CNOD), and includes power supply lines 310, 320. The power supply line 310 is configured to receive a first supply voltage, e.g., VDD. The power supply line 320 is configured to receive a second supply voltage, e.g., a VSS, lower than the first supply voltage.

The SVT functional cell 150 further includes an SVT transistor 330 that in this embodiment is an FET, e.g., a p-type or n-type MOSFET. As illustrated in FIG. 3, the SVT transistor 330 includes first and second source/drain regions 330a, 330b over the first end portion of the continuous active region (CNOD), a channel region (not visible) between the first and second source/drain regions 330a, 330b, and an active gate electrode 330c over the channel region thereof.

The SVT functional cell 160 is enclosed by a boundary (indicated by dash lines 380b), is disposed in the second end portion of the continuous active region (CNOD), and shares the power supply lines 310, 320 with the SVT functional cell 150.

The SVT functional cell 160 further includes an SVT transistor 340 that in this embodiment is an FET, e.g., a p-type or n-type MOSFET. As illustrated in FIG. 3, the SVT transistor 340 includes first and second source/drain regions 340a, 340b over the second end portion of the continuous active region (CNOD), a channel region (not visible) between the first and second source/drain regions 340a, 340b, and an active gate electrode 340c over the channel region thereof.

The SVT functional cell 150 further includes a dummy gate electrode 360a disposed at a left side of the boundary 380a. The SVT functional cell 160 further includes a dummy gate electrode 360b disposed at a right side of the boundary 380b. The SVT functional cells 150, 160 share a dummy gate electrode 360c disposed at an interface of the boundaries 380a, 380b.

In this embodiment, the dummy gate electrodes 360a, 360b, 360c are tied, i.e., connected, to the power supply line 310, through a horizontal metal line and/or a vertical metal line. In an alternative embodiment, at least one of the dummy gate electrodes 360a, 360b, 360c is connected to the power supply line 320.

It is noted that the dummy gate electrode 360c, the second source/drain region 330b, and the first source/drain region 340a together may form a parasitic transistor. As such, a leakage current ($I_{leakage}$) may occur between the SVT functional cells 150, 160. However, since the SVT functional cells 150, 160 have the same threshold voltage, such a leakage current ($I_{leakage}$) is small, i.e., negligible. This is because the SVT functional cells 150, 160 are produced by performing doping processes at the same dopant concentration (or by depositing metal gates having the same work function).

Figure 4:
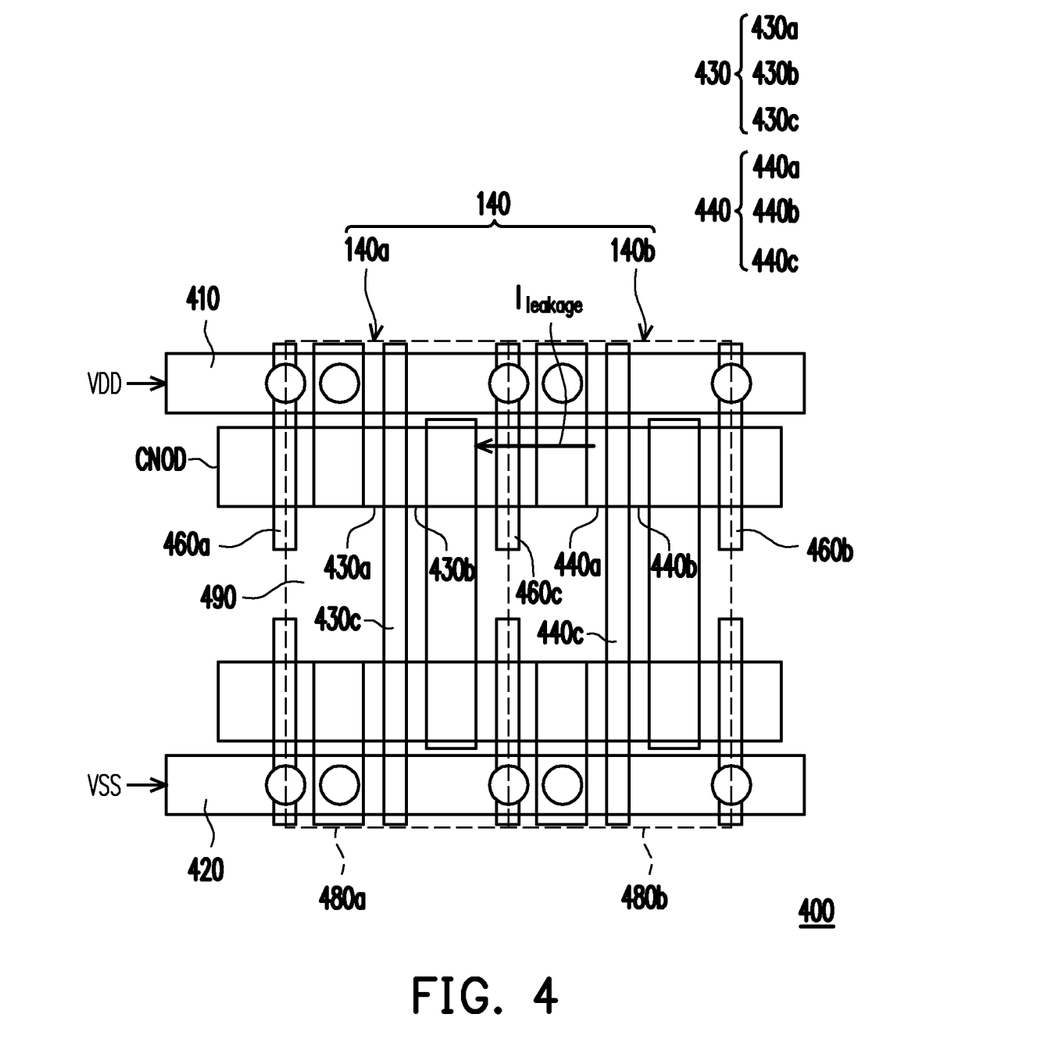
FIG. 4 is a schematic view illustrating an exemplary layout of a functional cell unit of a semiconductor device in accordance with some embodiments.

FIG. 4 is a schematic view illustrating an exemplary layout 400 of a pair of functional cells of a semiconductor device, e.g., the SVT and LVT functional cells 140a, 140b of the semiconductor device 100, in accordance with some embodiments. The semiconductor device 100 includes a substrate 490 that has a continuous active region (CNOD). The continuous active region (CNOD) includes opposite first and second end portions and an intermediate portion between the first and second end portions thereof.

The SVT and LVT functional cells 140a, 140b have the different threshold voltages and abut against each other. The SVT functional cell 140a is enclosed by a boundary (indicated by dash lines 480a), is disposed in the first end portion of the continuous active region (CNOD), and includes power supply lines 410, 420. The power supply line 410 is configured to receive a first supply voltage, e.g., VDD. The power supply line 420 is configured to receive a second supply voltage, e.g., a VSS, lower than the first supply voltage.

The SVT functional cell 140a further includes an SVT transistor 430 that in this embodiment is an FET, e.g., a p-type or n-type MOSFET. As illustrated in FIG. 4, the SVT transistor 430 includes first and second source/drain regions 430a, 430b over the first end portion of the continuous active region (CNOD), a channel region (not visible) between the first and second source/drain regions 430a, 430b, and an active gate electrode 430c over the channel region thereof.

The LVT functional cell 140b is enclosed by a boundary (indicated by dash lines 480b), is disposed in the second end portion of the continuous active region (CNOD), and shares the power supply lines 410, 420 with the SVT functional cell 140a.

The LVT functional cell 140b further includes an LVT transistor 440 that in this embodiment is an FET, e.g., a p-type or n-type MOSFET. As illustrated in FIG. 4, the LVT transistor 440 includes first and second source/drain regions 440a, 440b over the second end portion of the continuous active region (CNOD), a channel region (not visible) between the first and second source/drain regions 440a, 440b, and an active gate electrode 440c over the channel region thereof.

The SVT functional cell 140a further includes a dummy gate electrode 460a disposed at a left side of the boundary 480a. The LVT functional cell 140b further includes a dummy gate electrode 460b disposed at a right side of the boundary 480b. The SVT and LVT functional cells 140a, 140b share a dummy gate electrode 460c disposed at an interface of the boundaries 480a, 480b.

In this embodiment, the dummy gate electrodes 460a, 460b, 460c are tied, i.e., connected, to the power supply line 410, through a horizontal metal line and/or a vertical metal line. In an alternative embodiment, at least one of the dummy gate electrodes 460a, 460b, 460c is connected to the power supply line 420.

It is noted that the dummy gate electrode 460c, the second source/drain region 430b, and the first source/drain region 440a together may form a parasitic transistor. As such, a high leakage current ($I_{leakage}$) may occur between the SVT and LVT functional cells 140*a*, 140*b*. This is because the SVT and LVT functional cells 140*a*, 140*b* are produced by performing doping processes at different dopant concentrations (or by depositing metal gates having different work functions). As described above, such doping processes (or deposition of metal gates) can result in an undesired contamination of the first and second end portions of the continuous active region (CNOD) with incorrect dopant concentration (or in an undesired contamination of the metal gates of the SVT and LVT functional cells 140*a*, 140*b* with incorrect work function).

In an alternative embodiment, the semiconductor device does not include a functional unit (i.e., the functional unit 140), which includes a pair of functional cells that have different threshold voltages and that abut against each other.

Figure 5:
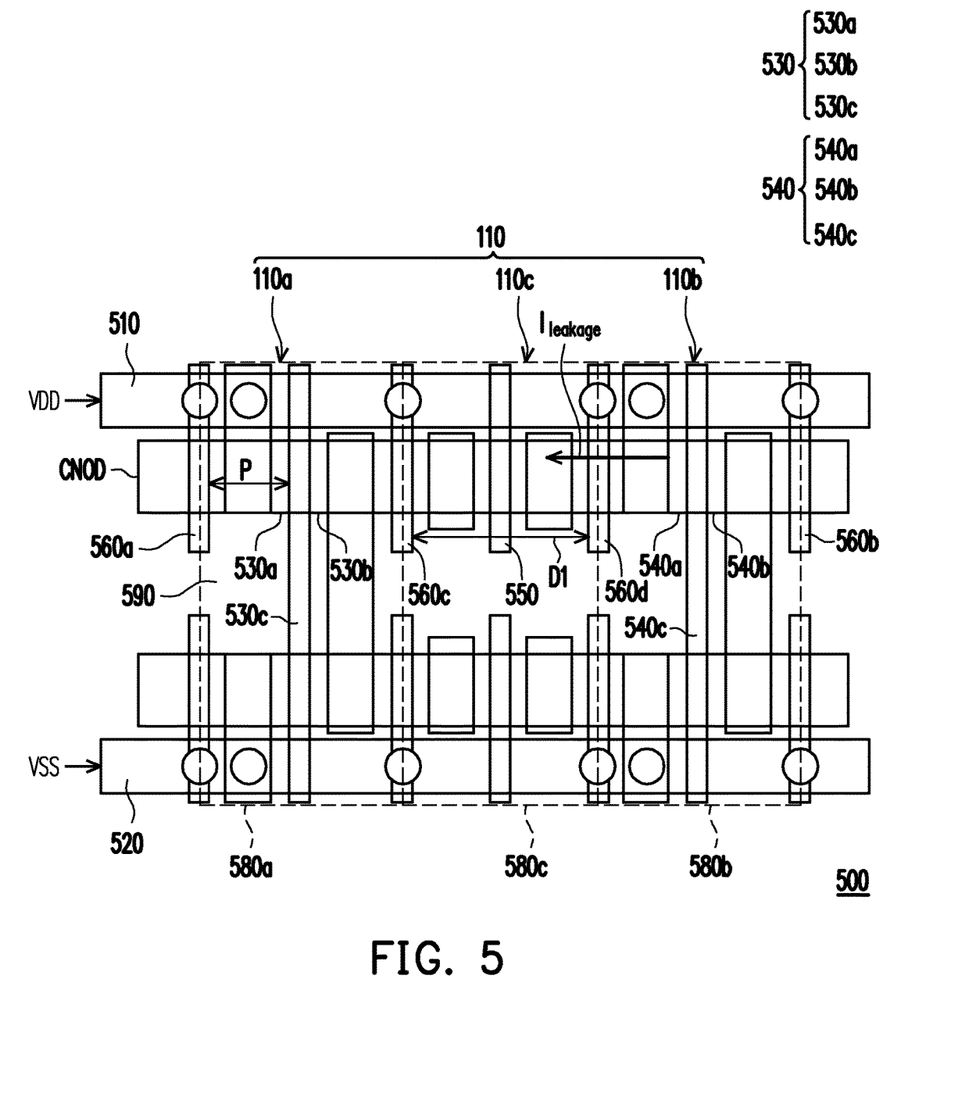
FIG. 5 is a schematic view illustrating another exemplary layout of a functional cell unit of a semiconductor device in accordance with some embodiments.

FIG. 5 is a schematic view illustrating an exemplary layout 500 of a functional cell unit of a semiconductor device, e.g., the functional cell unit 110 of the semiconductor device 100, in accordance with some embodiments. The semiconductor device 100 includes a substrate 590 that has a continuous active region (CNOD). The continuous active region (CNOD) includes opposite first and second end portions and an intermediate portion between the first and second end portions thereof.

The functional cell unit 110 includes SVT and LVT functional cells 110*a*, 110*b* and a filler cell 110*c*. The SVT functional cell 110*a* is enclosed by a boundary (indicated by dash lines 580*a*), is disposed in the first end portion of the continuous active region (CNOD), and includes power supply lines 510, 520. The power supply line 510 is configured to receive a first supply voltage, e.g., VDD. The power supply line 520 is configured to receive a second supply voltage, e.g., VSS, lower than the first supply voltage.

The SVT functional cell 110*a* further includes an SVT transistor 530 that in this embodiment is an FET, e.g., a p-type or n-type MOSFET. As illustrated in FIG. 5, the SVT transistor 530 includes first and second source/drain regions 530*a*, 530*b* over the first end portion of the continuous active region (CNOD), a channel region (not visible) between the first and second source/drain regions 530*a*, 530*b*, and an active gate electrode 530*c* over the channel region thereof.

The LVT functional cell 110*b* is enclosed by a boundary (indicated by dash lines 580*b*), is disposed in the second end portion of the continuous active region (CNOD), and shares the power supply lines 510, 520 with the SVT functional cell 110*a*.

The LVT functional cell 110*b* further includes an LVT transistor 540 that in this embodiment is an FET, e.g., a p-type or n-type MOSFET. As illustrated in FIG. 5, the LVT transistor 540 includes first and second source/drain regions 540*a*, 540*b* over the second end portion of the continuous active region (CNOD), a channel region (not visible) between the first and second source/drain regions 540*a*, 540*b*, and an active gate electrode 540*c* over the channel region thereof.

In some embodiments, the first and second end portions of the continuous region (CNOD) are of different dopant concentrations, thereby permitting the SVT and LVT functional cells 110*a*, 110*b* to have different threshold voltages. In other embodiments, the SVT and LVT transistors 530, 540 are of different work functions, whereby the SVT and LVT functional cells 110*a*, 110*b* can have different threshold voltages.

The filler cell 110*c* is enclosed by a boundary (indicated by dash lines 580*c*) and is disposed at the intermediate portion of the continuous active region (CNOD), i.e., between the SVT and LVT functional cells 110*a*, 110*b*. The intermediate portion of the continuous active region (CNOD) is not tied/connected to the power supply line 510/520 or any signal source. In this embodiment, the filler cell 110*c* includes a filler gate electrode 550. As illustrated in FIG. 5, the filler gate electrode 550 is floating, i.e., free of connection with the power supply line 510/520. In an alternative embodiment, the filler gate electrode 550 is tied, i.e., connected, to the power supply line 510/520, through a horizontal metal line and/or a vertical metal line.

Although the functional cell unit 100 is exemplified such that the filler cell 110*c* includes a single filler gate electrode 550, the filler cell 110*c* may include any number of filler gate electrodes 550 as required.

The SVT functional cell 110*a* further includes a dummy gate electrode 560*a* disposed at a left side of the boundary 580*a*. The LVT functional cell 110*b* further includes a dummy gate electrode 560*b* disposed at a right side of the boundary 580*b*. The SVT functional cell 110*a* and the filler cell 110*c* share a dummy gate electrode 560*c* disposed at an interface of the boundaries 580*a*, 580*c*. The LVT functional cell 110*b* and the filler cell 110*c* share a dummy gate electrode 560*d* disposed at an interface of the boundaries 580*b*, 580*c*.

In this embodiment, the dummy gate electrodes 560*a*, 560*b*, 560*c*, 560*d* are tied, i.e., connected, to the power supply line 510, through a horizontal metal line and/or a vertical metal line. In an alternative embodiment, at least one of the dummy gate electrodes 560*a*, 560*b*, 560*c*, 560*d* is connected to the power supply line 520.

It is noted that the dummy gate electrodes 560*c*, 560*d*, the second source/drain region 530*b*, and the first source/drain region 540*a* together may form a parasitic transistor. As such, a leakage current ($I_{leakage}$) may occur between the SVT and LVT functional cells 110*a*, 110*b*. However, since the filler cell 110*c* separates the SVT and LVT functional cells 110*a*, 110*b*, such a leakage current ($I_{leakage}$) is reduced. This is because the SVT and LVT functional cells 110*a*, 110*b* are produced by performing doping processes at different dopant concentrations (or by depositing metal gates having different work functions). As described above, such doping processes (or deposition of metal gates) can result in an undesired contamination of the first and second end portions of the continuous active region (CNOD) with incorrect dopant concentration (or in an undesired contamination of the metal gates of the SVT and LVT functional cells 110*a*, 110*b* with incorrect work function). The filler cell 110*c* minimizes such an undesired contamination.

As illustrated in FIG. 5, the gate electrodes 530*c*, 540*c*, 550, 560*a*, 560*b*, 560*c*, 560*d* are arranged at a pitch (P). The dummy gate electrode 560*c* shared by the SVT functional cell 110*a* and the filler cell 110*c* and the dummy gate electrode 560*d* shared by the LVT functional cell 110*b* and the filler cell 110*c* are arranged at a distance (D1). In this embodiment, the ratio of the distance (D1) to the pitch (P) is substantially equal to 2.

Figure 6:
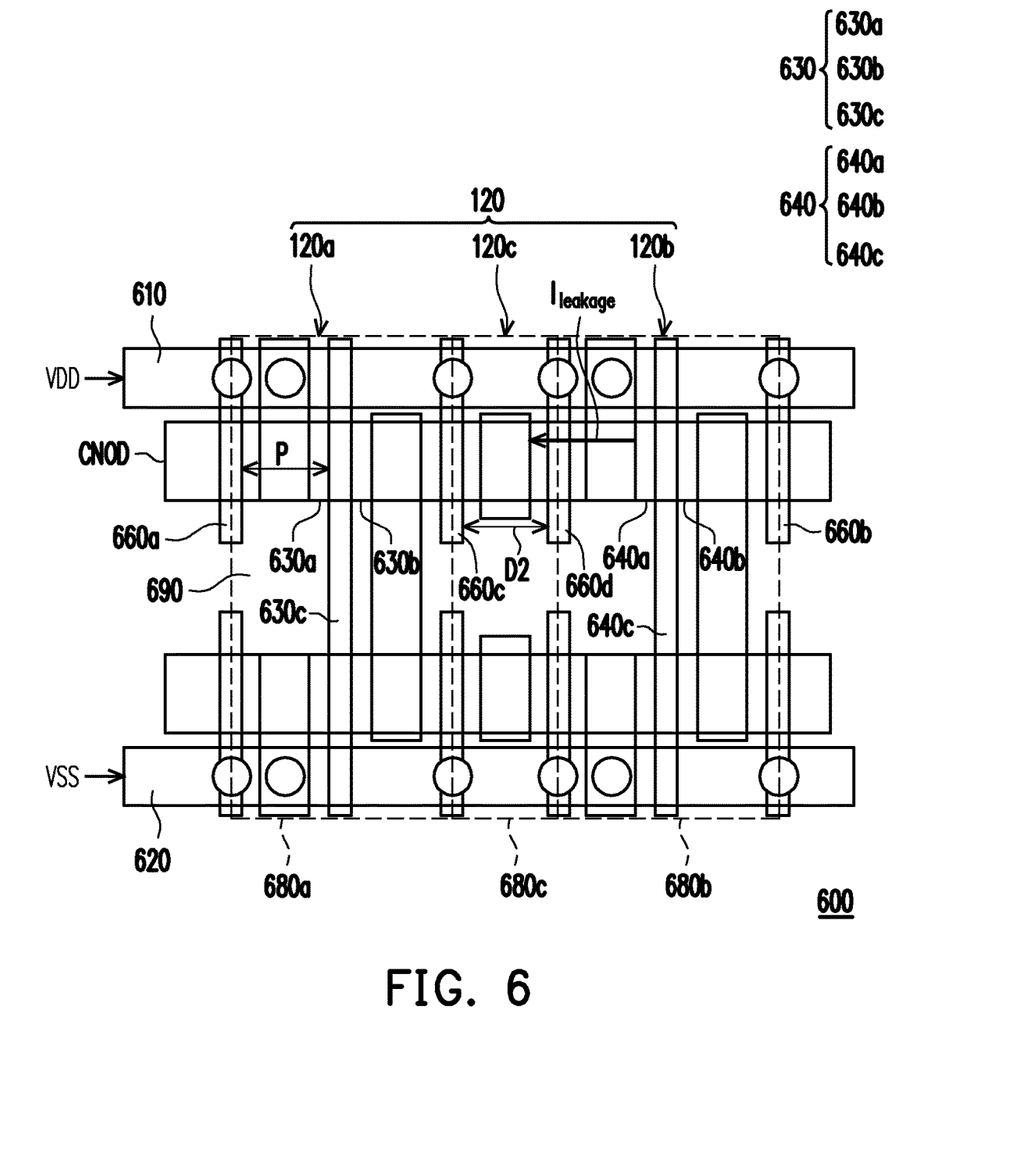
FIG. 6 is a schematic view illustrating another exemplary layout of a functional cell unit of a semiconductor device in accordance with some embodiments.

FIG. 6 is a schematic view illustrating an exemplary layout 600 of a functional cell unit of a semiconductor device, e.g., the functional cell unit 120 of the semiconductor device 100, in accordance with some embodiments. The semiconductor device 100 includes a substrate 690 that has a continuous active region (CNOD). The continuous active region (CNOD) includes opposite first and second end portions and an intermediate portion between the first and second end portions thereof.

The functional cell unit 120 includes uLVT and SVT functional cells 120*a*, 120*b* and a filler cell 120*c*. The uLVT functional cell 120*a* is enclosed by a boundary (indicated by dash lines 680a), is disposed in the first end portion of the continuous active region (CNOD), and includes power supply lines 610, 620. The power supply line 610 is configured to receive a first supply voltage, e.g., VDD. The power supply line 620 is configured to receive a second supply voltage, e.g., VSS, lower than the first supply voltage.

The uLVT functional cell 120a further includes a uLVT transistor 630 that in this embodiment is an FET, e.g., a p-type or n-type MOSFET. As illustrated in FIG. 6, the uLVT transistor 630 includes first and second source/drain regions 630a, 630b over the first end portion of the continuous active region (CNOD), a channel region (not visible) between the first and second source/drain regions 630a, 630b, and an active gate electrode 630c over the channel region thereof.

The SVT functional cell 120b is enclosed by a boundary (indicated by dash lines 680b), is disposed in the second end portion of the continuous active region (CNOD), and shares the power supply lines 610, 620 with the uLVT functional cell 120a.

The SVT functional cell 120b further includes an SVT transistor 640 that in this embodiment is an FET, e.g., a p-type or n-type MOSFET. As illustrated in FIG. 6, the SVT transistor 640 includes first and second source/drain regions 640a, 640b over the second end portion of the continuous active region (CNOD), a channel region (not visible) between the first and second source/drain regions 640a, 640b, and an active gate electrode 640c over the channel region thereof.

In some embodiments, the first and second end portions of the continuous region (CNOD) are of different dopant concentrations, thereby permitting the uLVT and SVT functional cells 120a, 120b to have different threshold voltages. In other embodiments, the uLVT and SVT transistors 630, 640 are of different work functions, whereby the uLVT and SVT functional cells 120a, 120b can have different threshold voltages.

The filler cell 120c is enclosed by a boundary (indicated by dash lines 680c) and is disposed at the intermediate portion of the continuous active region (CNOD), i.e., between the uLVT and SVT functional cells 120a, 120b. The intermediate portion of the continuous active region (CNOD) is not tied/connected to the power supply line 610/620 or any signal source. In this embodiment, the filler cell 120c does not have a filler gate electrode, e.g., the filler gate electrode 550 of FIG. 5.

The uLVT functional cell 120a further includes a dummy gate electrode 660a disposed at a left side of the boundary 680a. The SVT functional cell 120b further includes a dummy gate electrode 660b disposed at a right side of the boundary 680b. The uLVT functional cell 120a and the filler cell 120c share a dummy gate electrode 660c disposed at an interface of the boundaries 680a, 680c. The SVT functional cell 120b and the filler cell 120c share a dummy gate electrode 660d disposed at an interface of the boundaries 680b, 680c.

In this embodiment, the dummy gate electrodes 660a, 660b, 660c, 660d are tied, i.e., connected, to the power supply line 610, through a horizontal metal line and/or a vertical metal line. In an alternative embodiment, at least one of the dummy gate electrodes 660a, 660b, 660c, 660d is connected to the power supply line 620.

It is noted that the dummy gate electrodes 660c, 660d, the second source/drain region 630b, and the first source/drain region 640a together may form a parasitic transistor. As such, a leakage current ($I_{leakage}$) may occur between the uLVT and SVT functional cells 120a, 120b. However, since the filler cell 120c separates the uLVT and SVT functional cells 120a, 120b, such a leakage current ($I_{leakage}$) is reduced. This is because the uLVT and SVT functional cells 120a, 120b are produced by performing doping processes at different dopant concentrations (or by depositing metal gates having different work functions). As described above, such doping processes (or deposition of metal gates) can result in an undesired contamination of the first and second end portions of the continuous active region (CNOD) with incorrect dopant concentration (or in an undesired contamination of the metal gates of the uLVT and SVT functional cells 120a, 120b with incorrect work function). The filler cell 120c minimizes such an undesired contamination.

As illustrated in FIG. 6, the gate electrodes 630c, 640c, 660a, 660b, 660c, 660d are arranged at a pitch (P). The dummy gate electrode 660c shared by the uLVT functional cell 120a and the filler cell 120c and the dummy gate electrode 660d shared by the SVT functional cell 120b and the filler cell 120c are arranged at a distance (D2). In this embodiment, the ratio of the distance (D2) to the pitch (P) is substantially equal to 1.

Figure 7:
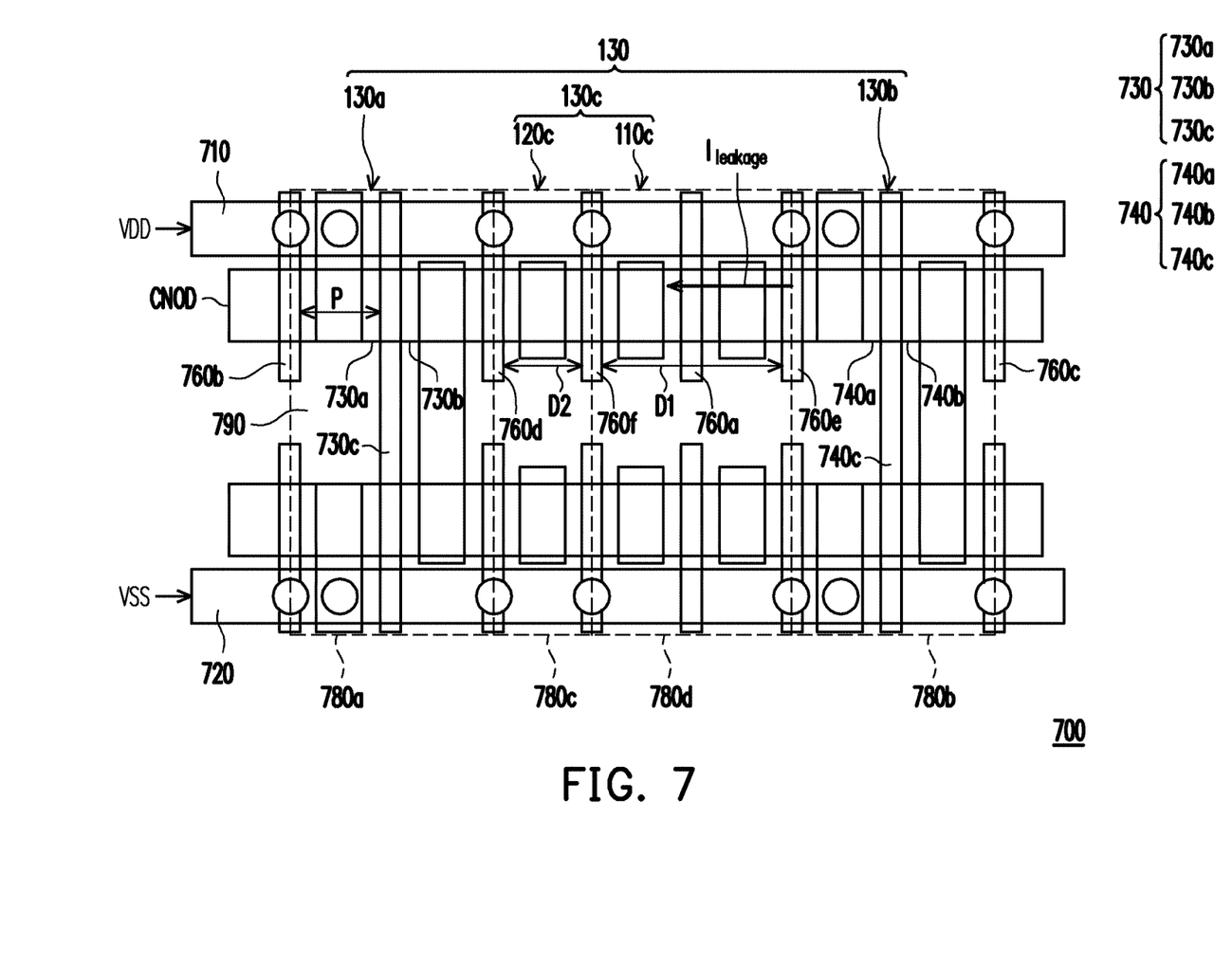
FIG. 7 is a schematic view illustrating another exemplary layout of a functional cell unit of a semiconductor device in accordance with some embodiments.

FIG. 7 is a schematic view illustrating an exemplary layout 700 of a functional cell unit of a semiconductor device, e.g., the functional cell unit 130 of the semiconductor device 100 of FIG. 1, in accordance with some embodiments. The semiconductor device 100 includes a substrate 790 that has a continuous active region (CNOD). The continuous active region (CNOD) includes opposite first and second end portions and an intermediate portion between the first and second end portions thereof.

The functional cell unit 130 includes LVT and uLVT functional cells 130a, 130b and a filler cell 130c. The LVT functional cell 130a is enclosed by a boundary (indicated by dash lines 780a), is disposed in the first end portion of the continuous active region (CNOD), and includes power supply lines 710, 720. The power supply line 710 is configured to receive a first supply voltage, e.g., VDD. The power supply line 720 is configured to receive a second supply voltage, e.g., VSS, lower than the first supply voltage.

The LVT functional cell 130a further includes an LVT transistor 730 that in this embodiment is an FET, e.g., a p-type or n-type MOSFET. As illustrated in FIG. 7, the LVT transistor 730 includes first and second source/drain regions 730a, 730b over the first end portion of the continuous active region (CNOD), a channel region (not visible) between the first and second source/drain regions 730a, 730b, and an active gate electrode 730c over the channel region thereof.

The uLVT functional cell 130b is enclosed by a boundary (indicated by dash lines 780b), is disposed in the second end portion of the continuous active region (CNOD), and shares the power supply lines 710, 720 with the LVT functional cell 130a.

The uLVT functional cell 130b further includes a uLVT transistor 740 that in this embodiment is an FET, e.g., a p-type or n-type MOSFET. As illustrated in FIG. 7, the uLVT transistor 740 includes first and second source/drain regions 740a, 740b over the second end portion of the continuous active region (CNOD), a channel region (not visible) between the first and second source/drain regions 740a, 740b, and an active gate electrode 740c over the channel region thereof.

In some embodiments, the first and second end portions of the continuous region (CNOD) are of different dopant concentrations, thereby permitting the LVT and uLVT functional cells 130a, 130b to have different threshold voltages. In other embodiments, the LVT and uLVT transistors 730, 740 are of different work functions, whereby the LVT and uLVT functional cells 130a, 130b can have different threshold voltages.

The filler cell 130c is a combination of a pair of filler cells, e.g., the filler cell 110c of FIG. 5 and the filler cell 120c of FIG. 6. The filler cell 120c is enclosed by a boundary (indicated by dash lines 780c) and is disposed in the intermediate portion of the continuous active region (CNOD), i.e., between the LVT functional cell 130a and the filler cell 110c. The filler cell 110c is enclosed by a boundary (indicated by dash lines 780d), includes a filler gate electrode 760a, and is disposed in the intermediate portion of the continuous active region (CNOD), i.e., between the uLVT functional cell 130b and the filler cell 120c. The intermediate portion of the continuous active region (CNOD) is not tied/connected to the power supply line 710/720 or any signal source.

The LVT functional cell 130a further includes a dummy gate electrode 760b disposed at a left side of the boundary 780a. The uLVT functional cell 130b further includes a dummy gate electrode 760c disposed at a right side of the boundary 780b. The LVT functional cell 130a and the filler cell 120c share a dummy gate electrode 760d disposed at an interface of the boundaries 780a, 780c. The uLVT functional cell 130b and the filler cell 110c share a dummy gate electrode 760e disposed at an interface of the boundaries 780b, 780d. The filler cells 110c, 120c share a dummy gate electrode 760f disposed at an interface of the boundaries 780c, 780d.

In this embodiment, the dummy gate electrodes 760b, 760c, 760d, 760e, 760f are tied, i.e., connected, to the power supply line 710, through a horizontal metal line and/or a vertical metal line. In an alternative embodiment, at least one of the dummy gate electrodes 760b, 760c, 760d, 760e, 760f is connected to the power supply line 720.

It is noted that the dummy gate electrodes 760d, 760e, 760f, the second source/drain region 730b, and the first source/drain region 740a together may form a parasitic transistor. As such, a leakage current ($I_{leakage}$) may occur between the LVT and uLVT functional cells 130a, 130b. However, since the filler cell 130c separates the LVT and uLVT functional cells 130a, 130b, such a leakage current ($I_{leakage}$) is reduced. This is because the LVT and uLVT functional cells 130a, 130b are produced by performing doping processes at different dopant concentrations (or by depositing metal gates having different work functions). As described above, such doping processes (or deposition of metal gates) can result in an undesired contamination of the first and second end portions of the continuous active region (CNOD) with incorrect dopant concentration (or in an undesired contamination of the metal gates of the uLVT and SVT functional cells 130a, 130b with incorrect work function). The filler cell 130c minimizes such an undesired contamination.

As illustrated in FIG. 7, the gate electrodes 730c, 740c, 760a, 760b, 760c, 760d, 760e, 760f are arranged at a pitch (P). The dummy gate electrode 760e shared by the uLVT functional cell 130b and the filler cell 110c and the dummy gate electrode 760f shared by the filler cells 110c, 120c are arranged at a distance (D1). The ratio of the distance (D1) to the pitch (P) is substantially equal to 2. The dummy gate electrode 760d shared by the LVT functional cell 130a and the filler cell 120c and the dummy gate electrode 760f shared by the filler cells 110c, 120c are arranged at a distance (D2). The ratio of the distance (D2) to the pitch (P) is substantially equal to 1.

Figure 8:
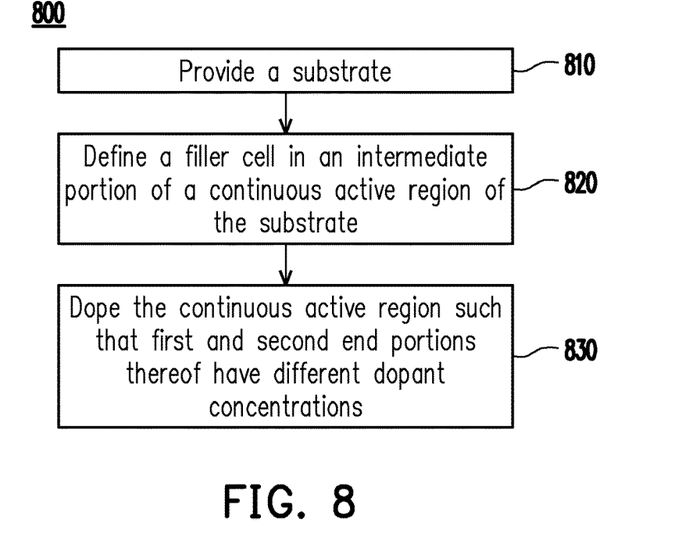
FIG. 8 is a flow chart illustrating an exemplary method of manufacturing a semiconductor device in accordance with some embodiments.

FIG. 8 is a flow chart illustrating a method 800 of manufacturing a semiconductor device in accordance with some embodiments. While the method 800 is applicable to many different structures, it is described here with reference to FIGS. 1 and 5-7 as an example to aid in understanding. In operation 810, a substrate of a semiconductor device, e.g., substrate of the semiconductor device 100, that has a first set of continuous active regions, e.g., the continuous active regions (CNOD), is provided. Each of the continuous active regions in the first set includes opposite first and second end portions (e.g., the first and second end portions of the continuous active region (CNOD) in which the SVT and LVT functional cells 110a, 110b, the uLVT and SVT functional cells 120a, 120b, or the LVT and uLVT functional cells 130a, 130b are formed, respectively) and an intermediate portion (e.g., the intermediate portion of the continuous active region (CNOD) in which the filler cell 110c, the filler cell 120c, or the filler cell 130c is formed) between the first and second end portions thereof.

In operation 820, a filler cell, e.g., the filler cell 110c, the filler cell 120c, or the filler cell 130c, is defined in the intermediate portion of each of the continuous active regions in the first set. In some embodiments, operation 820 is performed such that a number of the continuous active regions in the first set is equal to or greater than a number of a second set of continuous active regions, each of which includes first and second end portions that abut against each other. In other words, operation 820 is performed such that the ratio of the number of the continuous active regions in the first set to the sum of the numbers of the continuous active regions in the first and second sets ranges from about 0.5 to about 1. In other embodiments, operation 820 is performed such that the ratio of the number of the continuous active regions in the first set to the sum of the numbers of the continuous active regions in the first and second sets ranges from about 0.6 to about 1.0, from about 0.7 to about 1.0, from about 0.8 to about 1.0, or from about 0.9 to about 1.0.

In operation 830, each of the continuous active regions is doped, e.g., with n-type or p-type dopant, such that the first and second end portions thereof have different dopant concentrations. In this embodiment, operation 830 includes: forming a first mask layer over the substrate; patterning the first mask layer to form a first opening, through which a first end portion of a continuous active region is exposed; doping the first end portion of the continuous active region at a first dopant concentration through the opening; stripping the first mask layer; forming a second mask layer over the substrate; patterning the second mask layer to form a second opening, through which a second end portion of the continuous active region is exposed; doping the second end portion of the continuous active region through the second opening at a second dopant concentration different from the first dopant concentration; and stripping the second mask layer.

Because a filler cell is defined in operation 820, operation 830 does not result in undesired contamination of first and second end portions of a continuous active region with incorrect dopant concentration.

The method 800 further includes: forming a first functional cell, e.g., the SVT functional cell 110a, the uLVT functional cell 120a, or the LVT functional cell 130a, in a first end portion of a continuous active region; and forming a second functional cell, e.g., the LVT functional cell 110b, the SVT functional cell 120b, or the uLVT functional cell 130b, in a second end portion of a continuous active region.

Because first and second end portions of a continuous active region are doped in operation 830 at different dopant concentrations, the first and second functional cells will have different threshold voltages.

Figure 9:
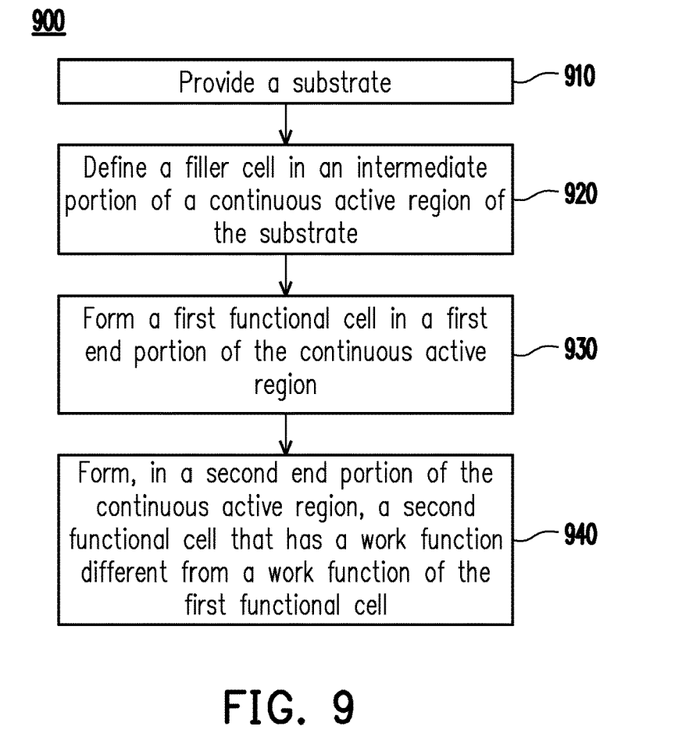
FIG. 9 is a flow chart illustrating another exemplary method of manufacturing a semiconductor device in accordance with some embodiments.

FIG. 9 is a flow chart illustrating a method 900 of manufacturing a semiconductor device in accordance with some embodiments. While the method 900 is applicable to many different structures, it is described here with reference to FIGS. 1 and 5-7 as an example to aid in understanding. In operation 910, a substrate of a semiconductor device, e.g., substrate of the semiconductor device 100, that has a first set of continuous active regions, e.g., the continuous active regions (CNOD), is provided. Each of the continuous active regions in the first set includes opposite first and second end portions (e.g., the first and second end portions of the continuous active region (CNOD) in which the SVT and LVT functional cells 110a, 110b, the uLVT and SVT functional cells 120a, 120b, or the LVT and uLVT functional cells 130a, 130b are formed, respectively) and an intermediate portion (e.g., the intermediate portion of the continuous active region (CNOD) in which the filler cell 110c, the filler cell 120c, or the filler cell 130c is formed) between the first and second end portions thereof.

In operation 920, a filler cell, e.g., the filler cell 110c, the filler cell 120c, or the filler cell 130c, is defined in the intermediate portion of each of the continuous active regions in the first set. In some embodiments, operation 920 is performed such that a number of the continuous active regions in the first set is equal to or greater than a number of a second set of continuous active regions, each of which includes first and second end portions that abut against each other. In other words, operation 920 is performed such that the ratio of the number of the continuous active regions in the first set to the sum of the numbers of the continuous active regions in the first and second sets ranges from about 0.5 to about 1. In other embodiments, operation 920 is performed such that the ratio of the number of the continuous active regions in the first set to the sum of the numbers of the continuous active regions in the first and second sets ranges from about 0.6 to about 1.0, from about 0.7 to about 1.0, from about 0.8 to about 1.0, or from about 0.9 to about 1.0.

In operation 930, a first functional cell, e.g., the functional cell 110a, the functional cell 120a, or the functional cell 130a, is formed in the first end portion of each of the continuous active regions. In this embodiment, operation 930 includes: defining first and second source/drain regions and a channel region of a transistor, e.g., the transistor 530, the transistor 630, or the transistor 730, in a first end portion of a continuous active region; depositing a gate dielectric, e.g., a high-K dielectric, over the channel region; depositing a first metal gate that has a first work function over the gate dielectric; and depositing an active gate electrode over the first metal gate.

In operation 940, a second functional cell, e.g., the functional cell 110b, the functional cell 120b, or the functional cell 130b, is formed in the second end portion of each of the continuous active regions. In this embodiment, operation 940 includes: defining first and second source/drain regions and a channel region of a transistor, e.g., the transistor 540, the transistor 640, or the transistor 740, in a second end portion of a continuous active region; depositing a gate dielectric, e.g., a high-K dielectric, over the channel region; depositing over the gate dielectric a second metal gate that has a second work function different from the first work function; and depositing an active gate electrode over the second metal gate.

Because the first and second metal gates deposited in operations 930, 940 are of different work functions, the first and second functional cells in these operations will have different threshold voltages. Also, because a filler cell is defined in operation 920, operations 930 and 940 do not result in undesired contamination of the transistors with incorrect work function.

While a filler cell may increase an area of a semiconductor device, the impact of such an increase may be lessen by performing routing processes, which connect functional cells of the semiconductor device, optimized to a combination of a power consumption of the semiconductor device, an area of the semiconductor device, and a leakage current of the semiconductor device, instead of only to power consumption as in a conventional routing process.

From the above description, the semiconductor device of the present disclosure includes a plurality of functional cell units, each of which includes a pair of functional cells that have different threshold voltages and a filler cell between the functional cells thereof. The construction as such reduces a leakage current of the semiconductor device, for about 14% to about 17% when compared to a conventional semiconductor device.

In an embodiment, an integrated circuit includes a substrate and a first set of functional cell units. The functional cell units are formed over the substrate. Each of the functional cell units includes a pair of functional cells that have different threshold voltages and a filler cell between the functional cells thereof. A number of the functional cell units in the first set is equal to or greater than a number of a second set of functional cell units, each of which includes a pair of functional cells that have different threshold voltages and that abut against each other.

In another embodiment, a method of manufacturing a semiconductor device comprises: providing a substrate that has a first set of continuous active regions, each of which has opposite first and second end portions and an intermediate portion between the first and second end portions; defining a filler cell in the intermediate portion of each of the continuous active regions in the first set such that a number of the continuous active regions in the first set is equal to or greater than a number of a second set of continuous active regions, each of which includes first and second end portions that abuts against each other; and doping each of the continuous active regions in the first and second sets such that the first and second end portions thereof have different dopant concentrations.

In another embodiment, a method of manufacturing a semiconductor device comprises: providing a substrate that has a first set of continuous active regions, each of which has opposite first and second end portions and an intermediate portion between the first and second end portions; defining a filler cell in the intermediate portion of each of the continuous active regions in the first set such that a number of the continuous active regions in the first set is equal to or greater than a number of a second set of continuous active regions, each of which includes first and second end portions that abut against each other; forming a first functional cell in the first end portion of each of the continuous active regions; and forming in the second end portion of each of the continuous active regions a second functional cell that has a work function different from a work function of the first functional cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
a substrate; and
a first set of functional cell units formed over the substrate, each of the functional cell units comprising:
a first pair of functional cells, a first cell in the first pair having a first threshold voltage and a second cell in the first pair having a second threshold voltage; and
a filler cell between the functional cells thereof;
a second set of functional cell units, each of which includes a second pair of functional cells, a third cell in the pair having a third threshold voltage and a fourth cell in the second pair having a fourth threshold voltage, the third cell and the fourth cell abutting against each other;
wherein a first number of the functional cell units in the first set is equal to or greater than a second number of the functional cell units in the second set.

2. The integrated circuit of claim 1, wherein a ratio of the first number to the sum of the first and second numbers ranges from 0.5 to 1.

3. The integrated circuit of claim 1, wherein the filler cell of one of the functional cell units in the first set has a filler gate electrode.

4. The integrated circuit of claim 3, wherein the filler gate electrode is floating.

5. The integrated circuit of claim 3, wherein the filler gate electrode is tied to a power supply line.

6. The integrated circuit of claim 1, wherein the filler cell of one of the functional cell units in first set has no filler gate electrode.

7. The integrated circuit of claim 1, wherein one of the functional cell units in the first set further includes a second filler cell between the functional cells thereof.

8. The integrated circuit of claim 1, further comprising:
an active gate electrode;
a first dummy gate electrode; and
a second dummy gate electrode, wherein the ratio of a distance between the first and second dummy gate electrodes to a pitch of the active gate electrode and the first dummy gate electrode is about 2.

9. The integrated circuit of claim 1, further comprising:
an active gate electrode;
a first dummy gate electrode; and
a second dummy gate electrode, wherein the ratio of a distance between the first and second dummy gate electrodes to a pitch of the active gate electrode and the first dummy gate electrode is about 1.

10. A semiconductor device, the device comprising:
a substrate;
a first set of pairs of continuous active regions, each of which comprises opposite first and second end portions and an intermediate portion between the opposite first and second end portions thereof;
a filler cell that spans between each of the intermediate portions of each of the continuous active regions in each pair in the first set;
a second set of pairs of continuous active regions, each of which includes first and second end portions that abut against each other;
wherein each of the continuous active regions in the first and second sets is doped such that the first and second end portions thereof have different dopant concentrations; and
wherein a first number of the continuous active regions in the first set is equal to or greater than a second number of continuous active regions in the second set.

11. The device of claim 10, further comprising:
a first functional cell that spans between each of the opposite first end portions of each of the continuous active regions in each pair in the first set;
a second functional cell that spans between each of the opposite second end portions of each of the continuous active regions in each pair in the first set;
a third functional cell that spans between each of the first end portions of each of the continuous active regions in each pair in the second set; and
a fourth functional cell that spans between each of the second end portions of each of the continuous active regions in each pair in the second set.

12. The device of claim 10, wherein the filler cell has a filler gate electrode.

13. The device of claim 10, wherein the filler cell does not have a filler gate electrode.

14. The device of claim 10, wherein the filler cell includes a first filler cell that has a filler gate electrode and a second filler cell that does not have a filler gate electrode.

15. The device of claim 10, wherein a ratio of the first number to the sum of the first and second numbers ranges from 0.5 to 1.

16. A semiconductor device, comprising:
a substrate that has a first set of continuous active regions, each of which has opposite first and second end portions and an intermediate portion between the opposite first and second end portions thereof;
a filler cell in the intermediate portion of each of the continuous active regions in the first set;
a first functional cell in the first end portion of each of the continuous active regions in the first and second sets, the first functional cell operating at a first threshold voltage; and
a second functional cell in the second end portion of each of the continuous active regions in the first and second sets that has a work function different from a work function of the first functional cell, the second functional cell operating at a second threshold voltage that is different from the first threshold voltage;
a second set of continuous active regions, each of which includes first and second end portions that abut against each other; and
wherein a first number of the continuous active regions in the first set is equal to or greater than a second number of the continuous active regions in the second set.

17. The device of claim 16, wherein the filler cell includes a filler cell that has a floating filler gate electrode.

18. The device of claim 16, wherein the filler cell includes a filler cell that has a filler gate electrode tied to a power supply line.

19. The device of claim 16, wherein the filler cell includes a filler cell that does not have a filler gate electrode.

20. The device of claim 16, wherein a ratio of the first to the sum of the first and second numbers ranges from 0.5 to 1.

* * * * *